United States Patent
Ruuska et al.

(10) Patent No.: US 9,307,416 B2
(45) Date of Patent: Apr. 5, 2016

(54) USING INFORMATION OBTAINED FROM ONE WIRELESS MEDIUM FOR COMMUNICATION IN ANOTHER WIRELESS MEDIUM

(75) Inventors: Paivi M. Ruuska, Tampere (FI); Miia Vainio, Pori (FI)

(73) Assignee: Nokia Technologies Oy, Espoo (FI)

( * ) Notice: Subject to any disclaimer, the term of this patent is extended or adjusted under 35 U.S.C. 154(b) by 737 days.

(21) Appl. No.: 12/863,591

(22) PCT Filed: Jan. 17, 2008

(86) PCT No.: PCT/IB2008/050175
§ 371 (c)(1),
(2), (4) Date: Jul. 19, 2010

(87) PCT Pub. No.: WO2009/090503
PCT Pub. Date: Jul. 23, 2009

(65) Prior Publication Data
US 2010/0291921 A1 Nov. 18, 2010

(51) Int. Cl.
*H04M 1/00* (2006.01)
*H04W 24/00* (2009.01)
(Continued)

(52) U.S. Cl.
CPC .............. *H04W 24/00* (2013.01); *H04W 28/06* (2013.01); *H04W 48/08* (2013.01); *H04W 52/0229* (2013.01); *H04W 52/0238* (2013.01);
(Continued)

(58) Field of Classification Search
CPC ....................................................... H04M 1/00
USPC ..................................................... 455/550.1
See application file for complete search history.

(56) References Cited

U.S. PATENT DOCUMENTS 8,204,445 B2 * 6/2012 Wood .......................... 455/67.11
2005/0215284 A1 9/2005 Su et al.
(Continued)

FOREIGN PATENT DOCUMENTS

EP 1583295 A2 10/2005
EP 1744571 A 1/2007
(Continued)

OTHER PUBLICATIONS

GB2439024 "Multi-Mode Coexisting method of Mult-imode Communication Equipment", Gongwei Wu, published Dec. 12, 2007.*
(Continued)

*Primary Examiner* — Huy C Ho
(74) *Attorney, Agent, or Firm* — Locke Lord LLP

(57) ABSTRACT

The present invention may include system for utilizing operational information obtained by one wireless communication medium that is supported by a wireless device in order to optimize the operation of another wireless communication medium also supported in the same device. More specifically, the present invention may leverage channel condition information collected as part of the standard operation of a wireless communication medium including interference avoidance capabilities, like Bluetooth™ with Adaptive Frequency Hopping (AFH), in order to modify the operation in another wireless communication medium such as by determining a channel scan list of potential operational channels to scan, determining a scan order for the channel scan list of potential communication channels based on, for example, the probability that a channel is currently being utilized by a target device, and/or altering a scan rate for one or more communication channels.

18 Claims, 13 Drawing Sheets

(51) Int. Cl.
    *H04B 5/00*         (2006.01)
    *H04B 7/00*         (2006.01)
    *H04W 28/06*      (2009.01)
    *H04W 48/08*      (2009.01)
    *H04W 76/02*      (2009.01)
    *H04W 84/04*      (2009.01)
    *H04W 84/12*      (2009.01)
    *H04W 84/18*      (2009.01)
    *H04W 52/02*      (2009.01)

(52) U.S. Cl.
    CPC ............. *H04W76/02* (2013.01); *H04W 84/042* (2013.01); *H04W 84/12* (2013.01); *H04W 84/18* (2013.01)

(56) References Cited

U.S. PATENT DOCUMENTS

| | | | |
|---|---|---|---|
| 2006/0009216 A1* | 1/2006 | Welnick et al. | 455/434 |
| 2007/0161349 A1 | 7/2007 | Grushkevich | |
| 2007/0263709 A1 | 11/2007 | Kasslin et al. | |
| 2007/0275746 A1* | 11/2007 | Bitran | 455/509 |
| 2009/0068970 A1* | 3/2009 | Ahmed et al. | 455/161.1 |
| 2009/0111496 A1* | 4/2009 | Ibrahim et al. | 455/512 |

FOREIGN PATENT DOCUMENTS

| | | | |
|---|---|---|---|
| EP | 1806872 A1 | 7/2007 | |
| WO | 2007036687 A | 4/2007 | |
| WO | 2007091202 A | 8/2007 | |
| WO | 2008044086 A1 | 4/2008 | |

OTHER PUBLICATIONS

International Search Report and Written Opinion of the International Searching Authority for corresponding International Patent Cooperation Treaty Application PCT/IB2008/050175, dated Oct. 22, 2008, pp. 1-15.

IEEE Standard for Information technologY—Telecommunications and information exchange between systems—Local and metropolitan area networks—Specific requirements Part 11: Wireless LAN Medium Access Control (MAC) and Physical Layer (PHY) Specifications, IEEE Std 802.11k™—2008, Jun. 12, 2008.

IEEE Standard for Information technology—Telecommunications and information exchange between systems—Local and metropolitan area networks—Specific requirements Part 15.4: Wireless Medium Access Control (MAC) and Physical Layer (PHY) Specifications for Low-Rate Wireless Personal Area Networks (WPANs), IEEE Std 802.15.4™-2006, Sep. 8, 2006.

IEEE Standard for Information technology—Telecommunications and information exchange between systems—Local and metropolitan area networks—Specific requirements Part 15.4: Wireless Medium Access Control (MAC) and Physical Layer (PHY) Specifications for Low-Rate Wireless Personal Area Networks (WPANs) Amendment 1: Add Alternate PHYs, IEEE Std 802.15.4a™—2007, Aug. 31, 2007.

IEEE Standard for Information technology—Telecommunications and information exchange between systems—Local and metropolitan area networks—Specific requirements Part 11: Wireless LAN Medium Access Control (MAC) and Physical Layer (PHY) Specifications, IEEE Std 802.11™-2007, Jun. 12, 2007.

* cited by examiner

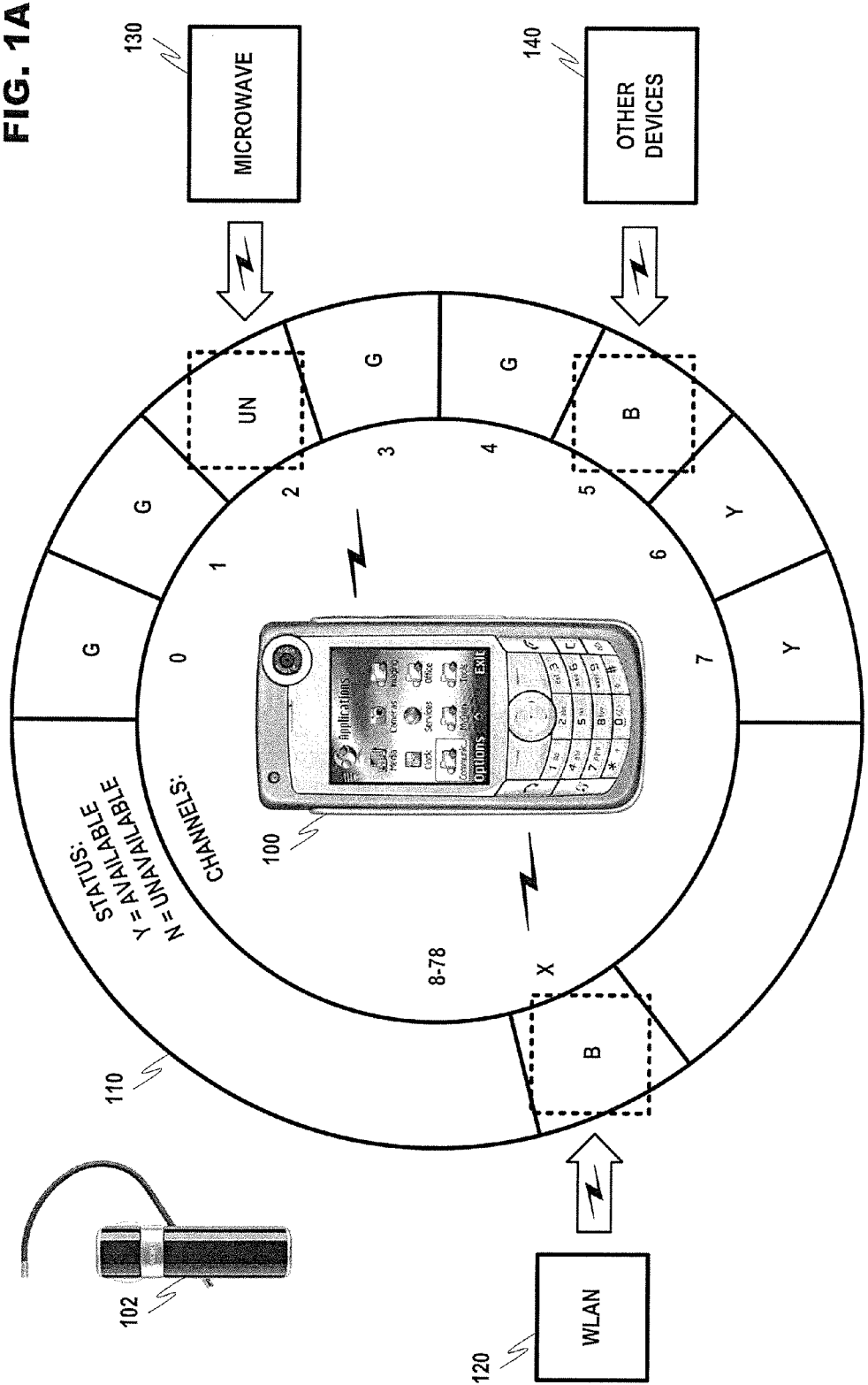

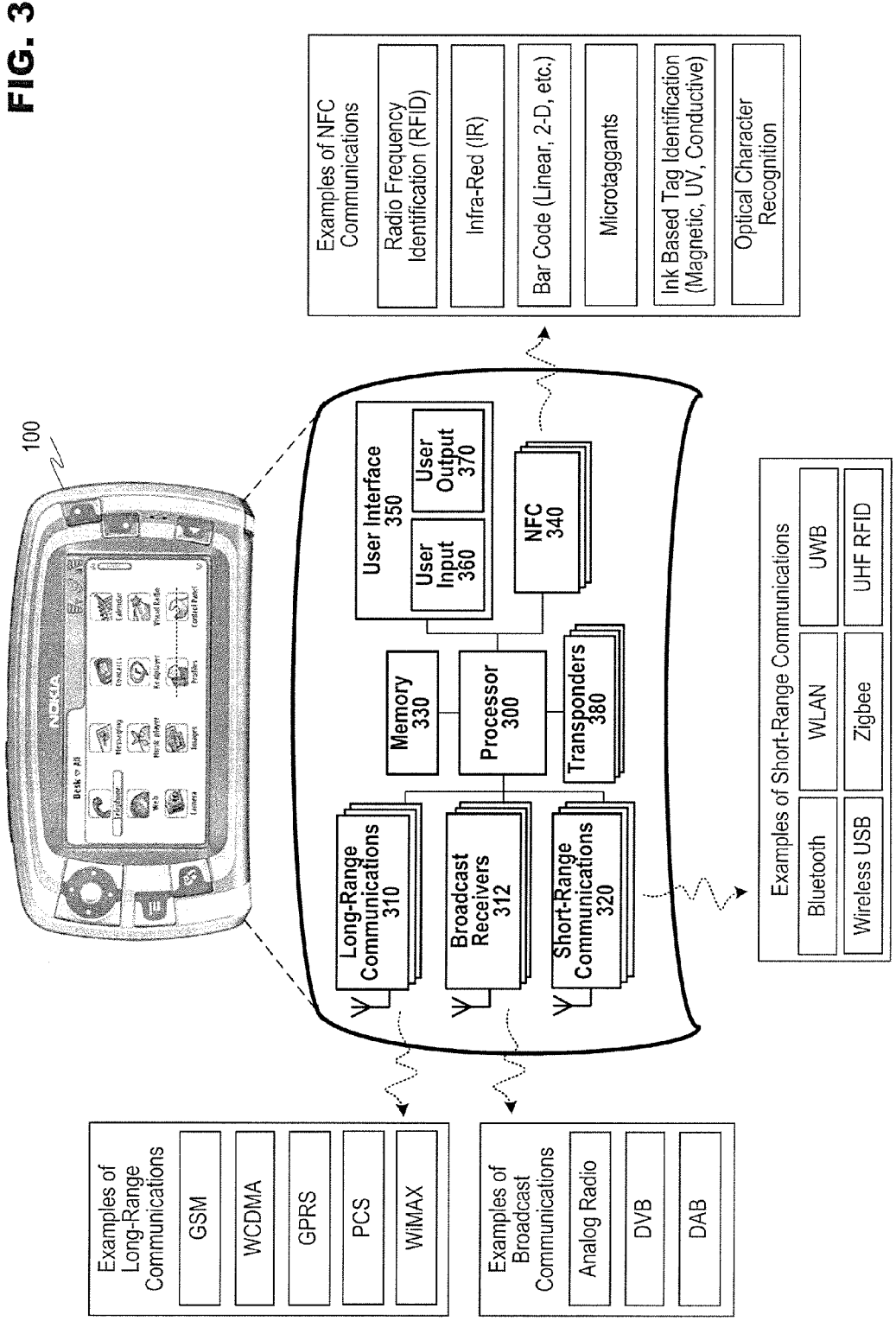

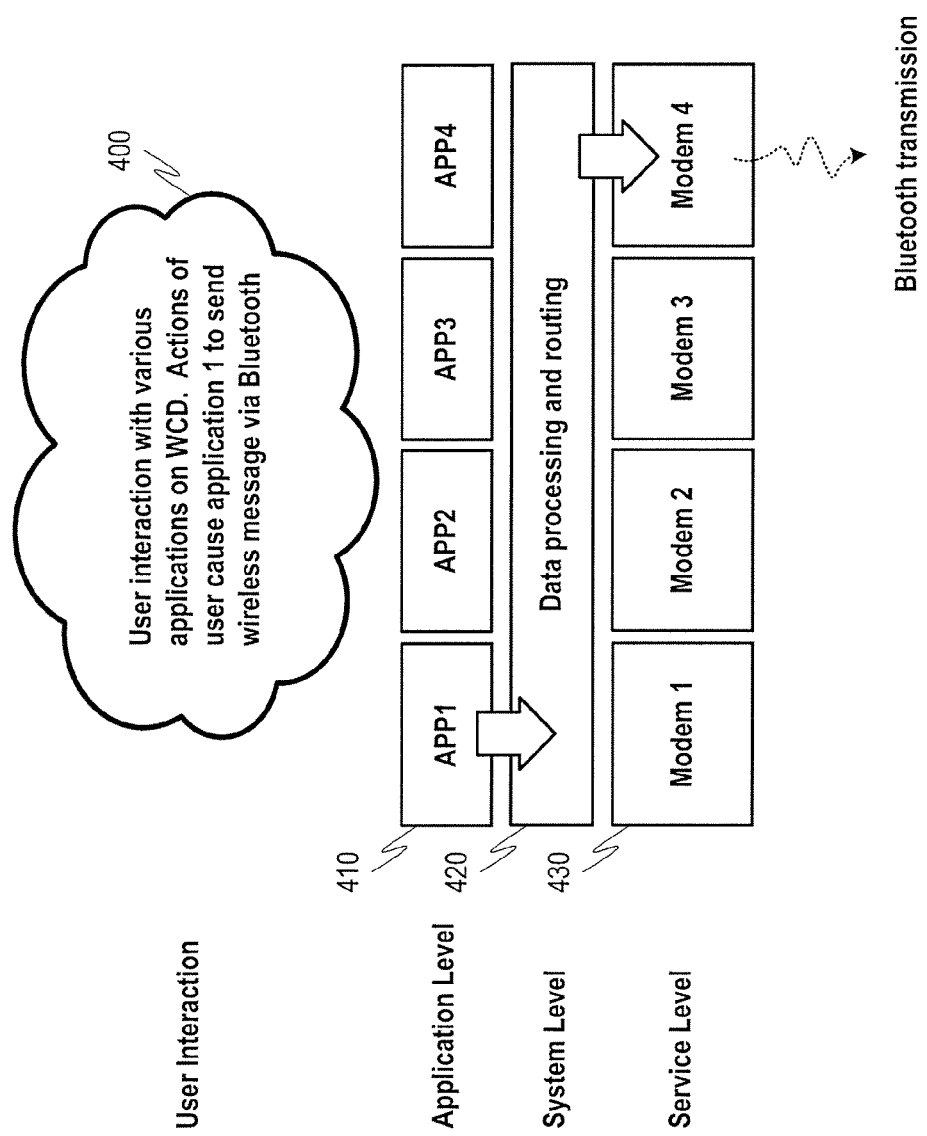

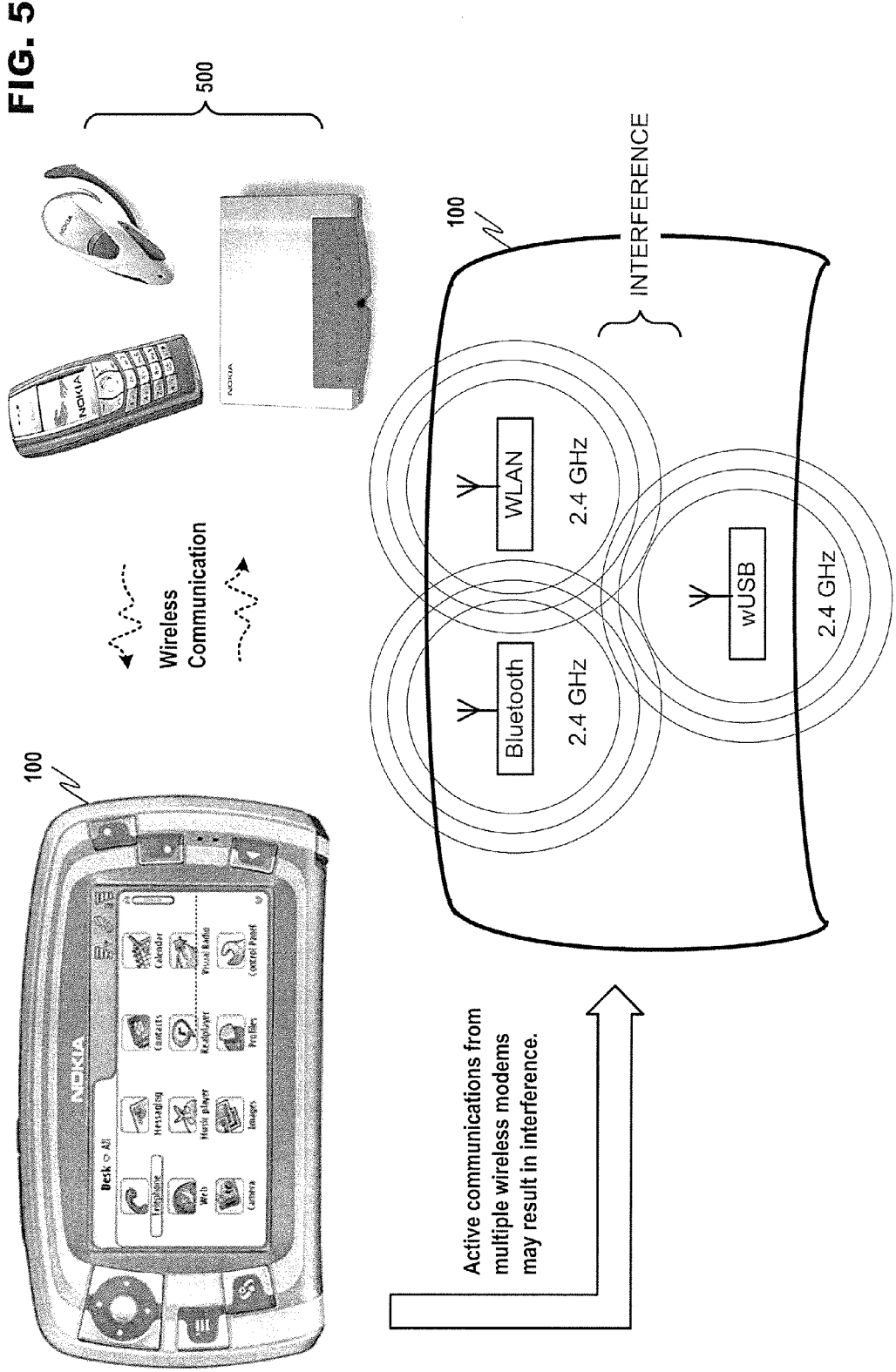

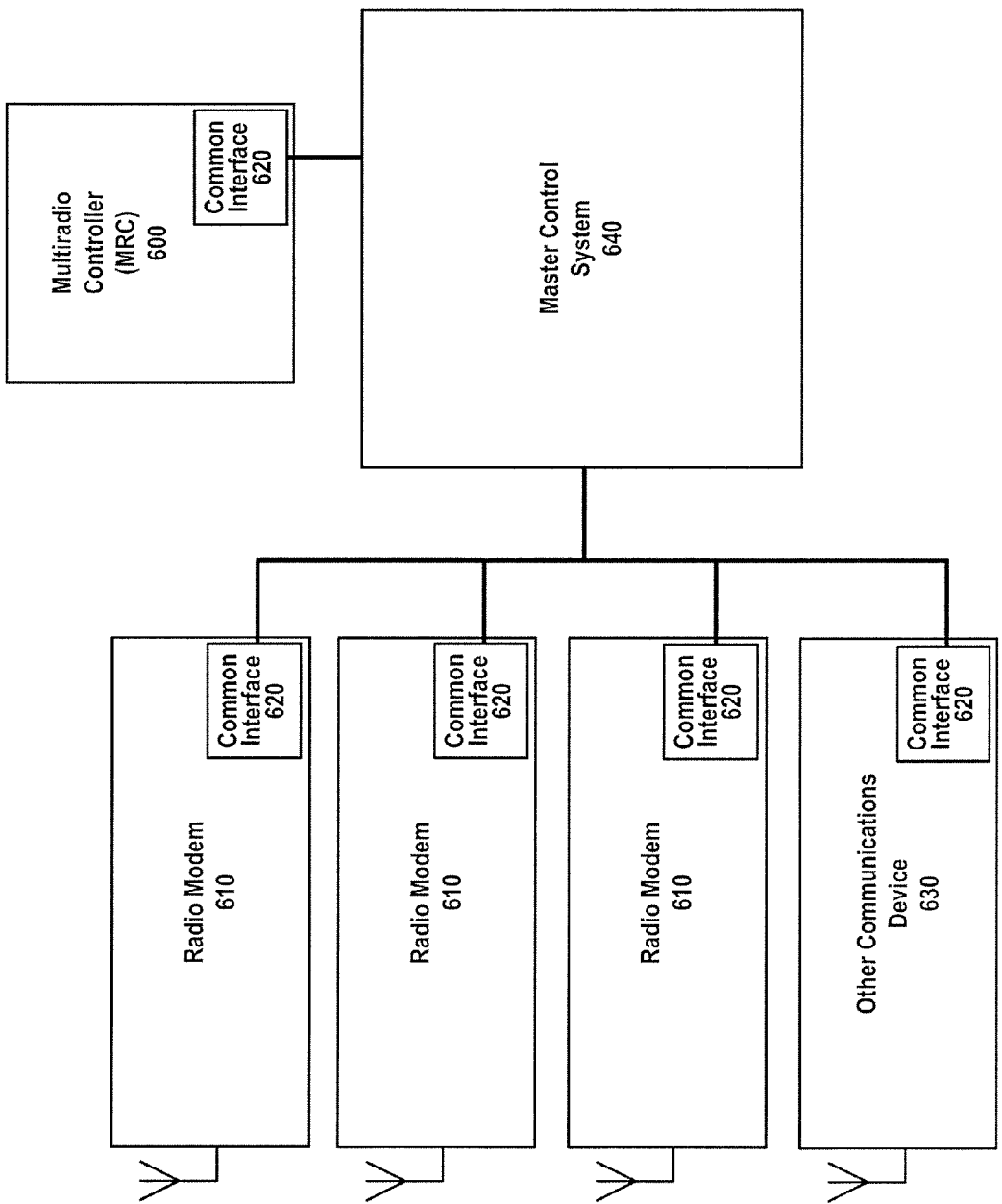

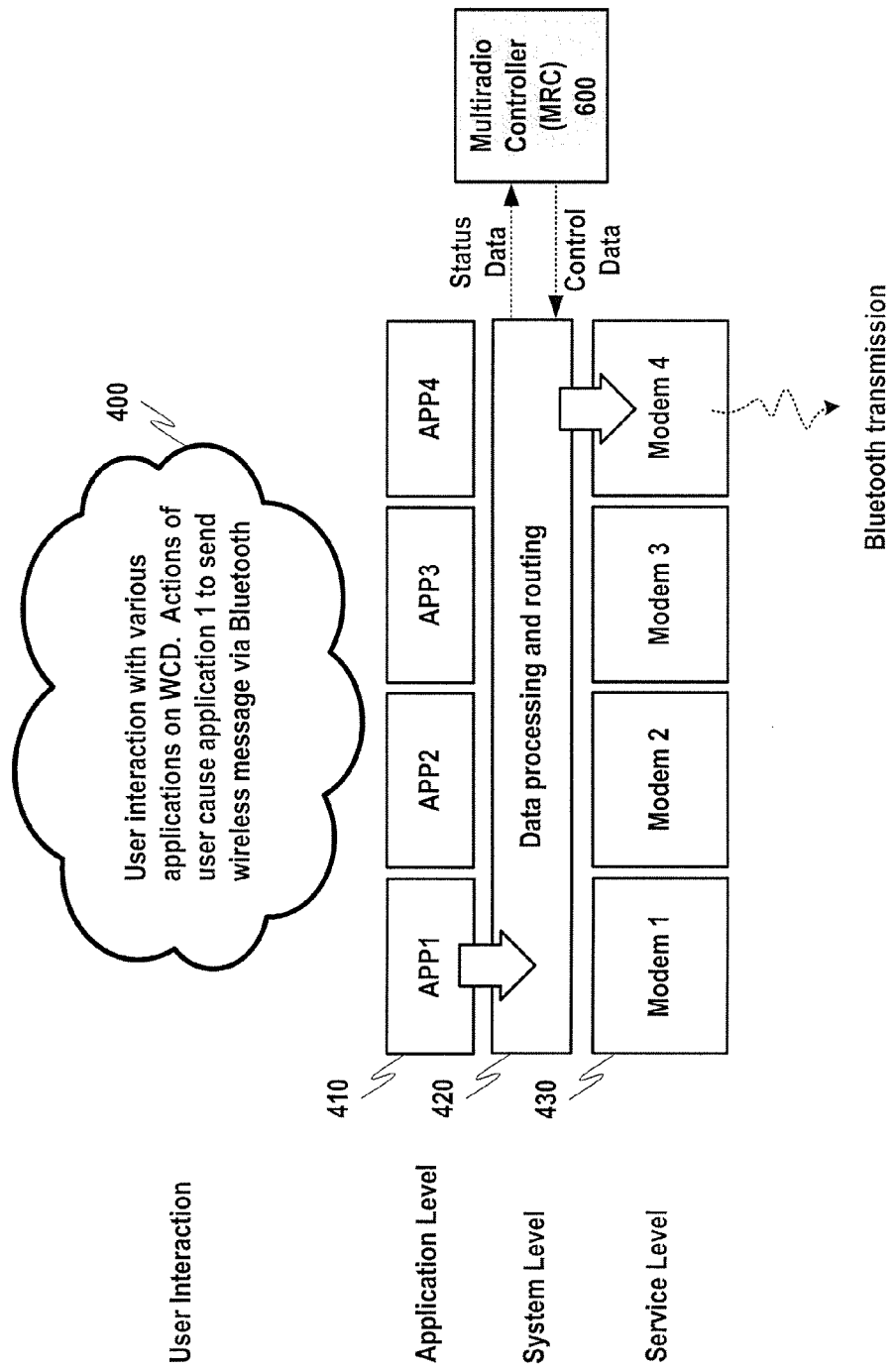

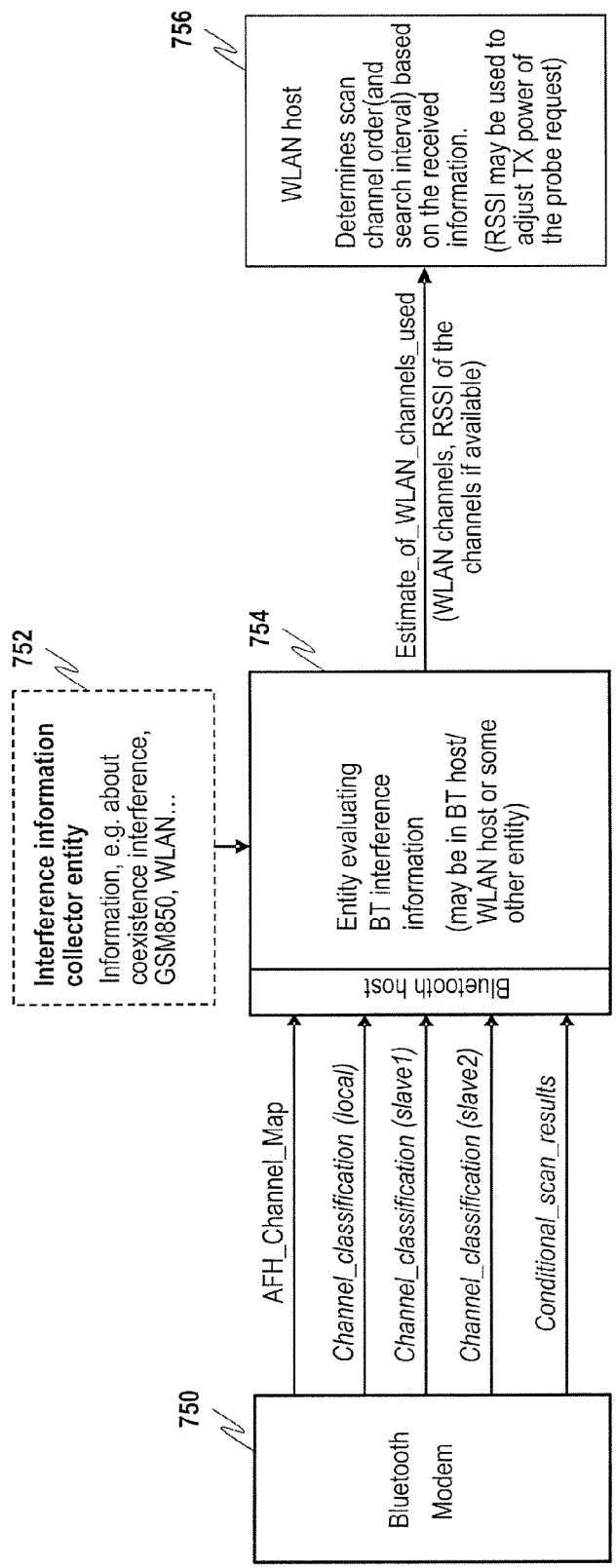

FIG. 8
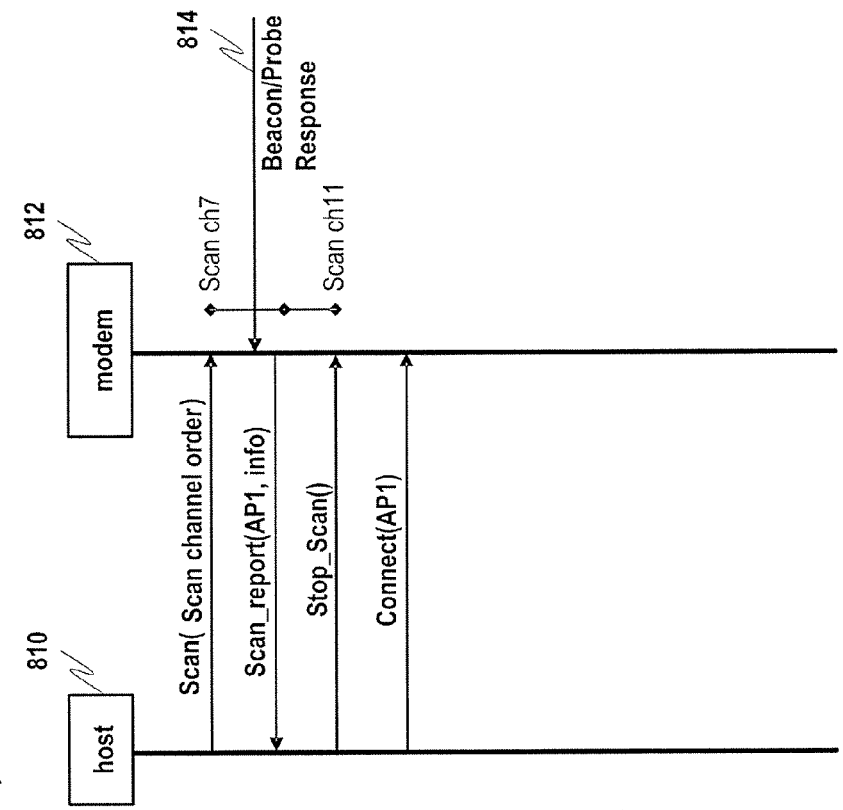
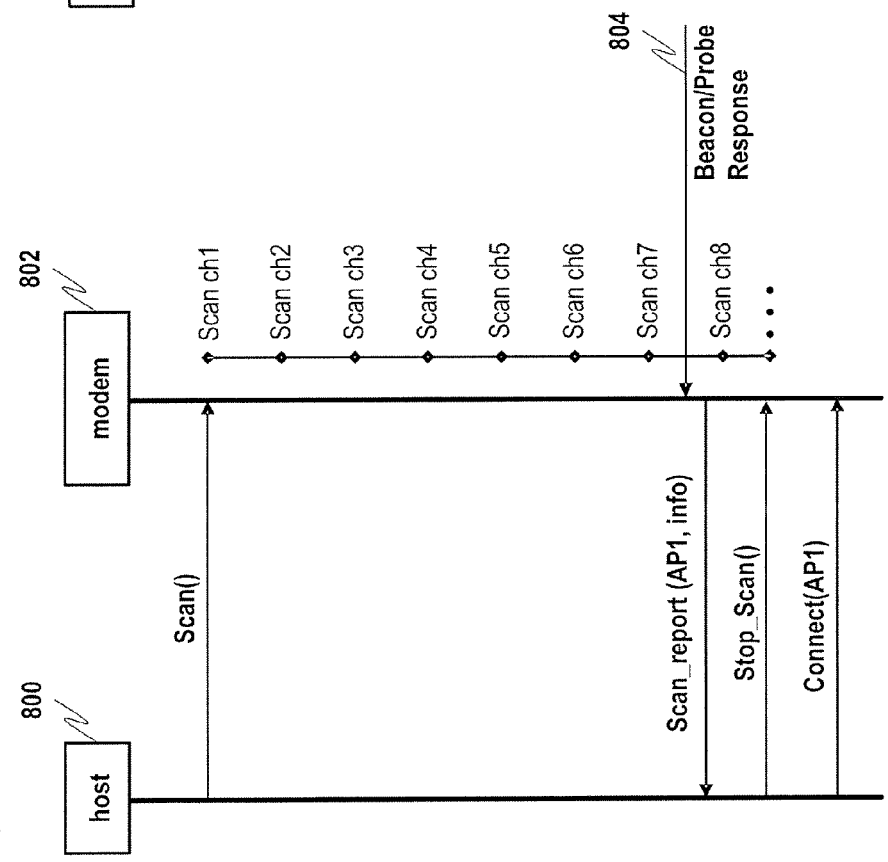

USING INFORMATION OBTAINED FROM ONE WIRELESS MEDIUM FOR COMMUNICATION IN ANOTHER WIRELESS MEDIUM

RELATED APPLICATION

This application was originally filed as PCT Application No. PCT/IB2008/050175 filed Jan. 17, 2008.

BACKGROUND OF INVENTION

1. Field of Invention

The present invention relates to facilitating the use of two or more wireless communication mediums in a device, and more specifically, to optimizing operation of at least one wireless medium in the device using information from another wireless medium.

2. Background

As communication technology evolves, the use of wireless communication has moved from a luxury to an integral part of today's society. A wireless communication device (WCD) may communicate using a multitude of mediums. These communication networks may be employed in various applications depending on the requirements of a given situation. Characteristics determining an appropriate network include the type of information to be transmitted, the expected transmission distance, the required speed of communication, the sensitivity of the information (security), the cost of use, the number of sources/recipients, etc.

Cellular networks support communication over large geographic areas. These network technologies have commonly been divided by generations, starting in the late 1970s to early 1980s with first generation (1G) analog cellular telephones that provided baseline voice communication, to modern digital cellular telephones. GSM is an example of a widely employed 2G digital cellular network communicating in the 900 MHZ/1.8 GHZ bands in Europe and at 850 MHz and 1.9 GHZ in the United States. This network provides voice communication and also supports the transmission of textual data via the Short Messaging Service (SMS). SMS allows a WCD to transmit and receive text messages of up to 160 characters, while providing data transfer to packet networks, ISDN and POTS users at 9.6 Kbps. The Multimedia Messaging Service (MMS), an enhanced messaging system allowing for the transmission of sound, graphics and video files in addition to simple text, has also become available in certain devices. Soon emerging technologies such as Digital Video Broadcasting for Handheld Devices (DVB-H) will make streaming digital video, and other similar content, available directly to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems of large cellular networks. Bluetooth™ is an example of a short-range wireless technology quickly gaining acceptance in the marketplace. A 1 Mbps Bluetooth™ radio may transmit and receive data at a rate of 720 Kbps within a range of 10 meters, and may transmit up to 100 meters with additional power boosting. Enhanced data rate (EDR) technology also available may enable maximum asymmetric data rates of 1448 Kbps for a 2 Mbps connection and 2178 Kbps for a 3 Mbps connection. A user does not actively instigate a Bluetooth™ network. Instead, a plurality of devices within operating range of each other may automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master. These devices continually switch between various active communication and power saving modes in order to transmit data to other piconet members. In addition to Bluetooth™ other popular short-range wireless networks include WLAN (of which "Wi-Fi" local access points communicating in accordance with the IEEE 802.11 standard, is an example), Wibree™, WUSB, UWB, ZigBee (802.15.4, 802.15.4a), and UHF RFID. All of these wireless mediums have features and advantages that make them appropriate for various applications.

More recently, manufacturers have also begun to incorporate various resources for providing enhanced functionality in WCDs (e.g., components and software for performing close-proximity wireless information exchanges). Sensors and/or scanners may be used to read visual or electronic information into a device. A transaction may involve a user holding their WCD in proximity to a target, aiming their WCD at an object (e.g., to take a picture) or sweeping the device over a printed tag or document. Near field communication technologies include machine-readable mediums such as radio frequency identification (RFID), Infra-red (IR) communication, optical character recognition (OCR) and various other types of visual, electronic and magnetic scanning are used to quickly input desired information into the WCD without the need for manual entry by a user.

While short-range communication networks like Bluetooth™ and WLAN can be convenient, they may also be somewhat limited in their application due to the unregulated nature of their operation. For example, interference created by a plurality of closely-situated apparatuses that emit signals operating in the same frequency range is a known problem in the art. More specifically, because wireless mediums like Bluetooth™ and WLAN operate in an unlicensed frequency band, other systems emitting radio waves in this band (e.g., other short-range radio and wireless networks, electronic emissions from microwave ovens, power systems, etc.) may cause background noise. This may limit the amount of channels on which a wireless communication medium may operate. In addition, interference from the proximal operation of other signal sources during communication on one or more radio channels may result in packets being lost, which may require the retransmission of this lost information and an overall reduction to wireless communication medium performance.

This impact in performance may occur with respect to speed, quality, energy conservation, etc. For example, wireless communication mediums that lack the ability to quickly identify communication channels on which potential target devices are operating (e.g., access points or other wireless devices) and/or the ability to exclude problematic communication channels must scan all potential communication channels, regardless of the current channel condition. The time and energy required to scan each of the channels in the allowed bandwidth may then become a fixed time and power burden that may be deemed, in some instances, to be a waste of resources when no available channels exist, or no other devices are within effective communication range of the wireless communication medium.

SUMMARY OF INVENTION

The present invention may include at least a method, apparatus, computer program and system for utilizing operational information obtained by one wireless medium in order to optimize the operation of another wireless medium. In various embodiments, the present invention may utilize channel condition information collected as part of the standard operation of a wireless communication medium including interference avoidance capabilities, like Bluetooth™ with Adaptive Frequency Hopping (AFH), in order to modify the operation of at least one other wireless communication medium (e.g., WLAN). Modifying operations may include activities such as determining a scan list of potential communication channels to scan, determining a scan order for the scan list of potential communication channels based on, for example, the probability that a channel is currently being utilized by a target device, and/or altering a scan rate for one or more communication channels.

In at least one configuration, the present invention may be implemented on a WCD including the ability to operate using a plurality of concurrently operating wireless communication mediums. At least one wireless communication medium may measure various potential communication channels to determine if any other signals are currently utilizing the channel. If the communication channel is available, resources in the WCD supporting the wireless communication medium may indicate that the channel is usable. If a channel is determined to contain interference, it may be labeled as bad. This measurement may occur for all channels in the designated bandwidth, and the channels identified as usable may then be formulated into a channel map for use with an AFH communication scheme.

Further examples of the present invention may incorporate the ability to classify the type of interference occurring on a channel. This classification may include characterizing the type of interference as related to other wireless communication mediums also employed in the WCD. Channels identified as possibly containing communication signals may be included in the channel scan list. In accordance with various embodiments of the present invention, the channels in the channel scanning list may further be sorted in an order to help facilitate faster connection establishment, which may in turn conserve both time and energy in the device. In addition, if a channel is determined to contain no interference, or another classification of wireless signal (e.g., simple electronic interference from a non-communication related device), then a scan rate for other wireless communication mediums may be adjusted in the WCD. For example, scan rates may be reduced for channels indicated as containing no signal, or unidentified signals, in order to conserve power in the device.

DESCRIPTION OF DRAWINGS

The present invention may be further understood from the following detailed description including various exemplary embodiments, taken in conjunction with appended drawings, in which:

FIG. 1A discloses an exemplary channel classification process in accordance with an embodiment of the present invention.

FIG. 3 discloses an exemplary functional representation of a wireless communication device in accordance with an embodiment of the present invention.

FIG. 4 discloses an exemplary operational description of a wireless communication device utilizing a wireless communication medium in accordance with at least one embodiment of the present invention.

FIG. 5 discloses an example wherein interference occurs when utilizing multiple radio modems simultaneously within the same wireless communication device.

FIG. 6B discloses a more detailed structural diagram of FIG. 6A including the multiradio controller and the radio modems.

FIG. 6C discloses an exemplary operational description of a wireless communication device including a multiradio controller in accordance with at least one embodiment of the present invention.

FIG. 7C discloses a functional diagram of a communication channel condition information sharing process in accordance with an embodiment of the present invention.

FIG. 8 discloses an exemplary representation of the effect of sharing communication channel condition information on a wireless communication medium in accordance with an embodiment of the present invention.

DESCRIPTION OF EXEMPLARY EMBODIMENTS

Figure 1B:
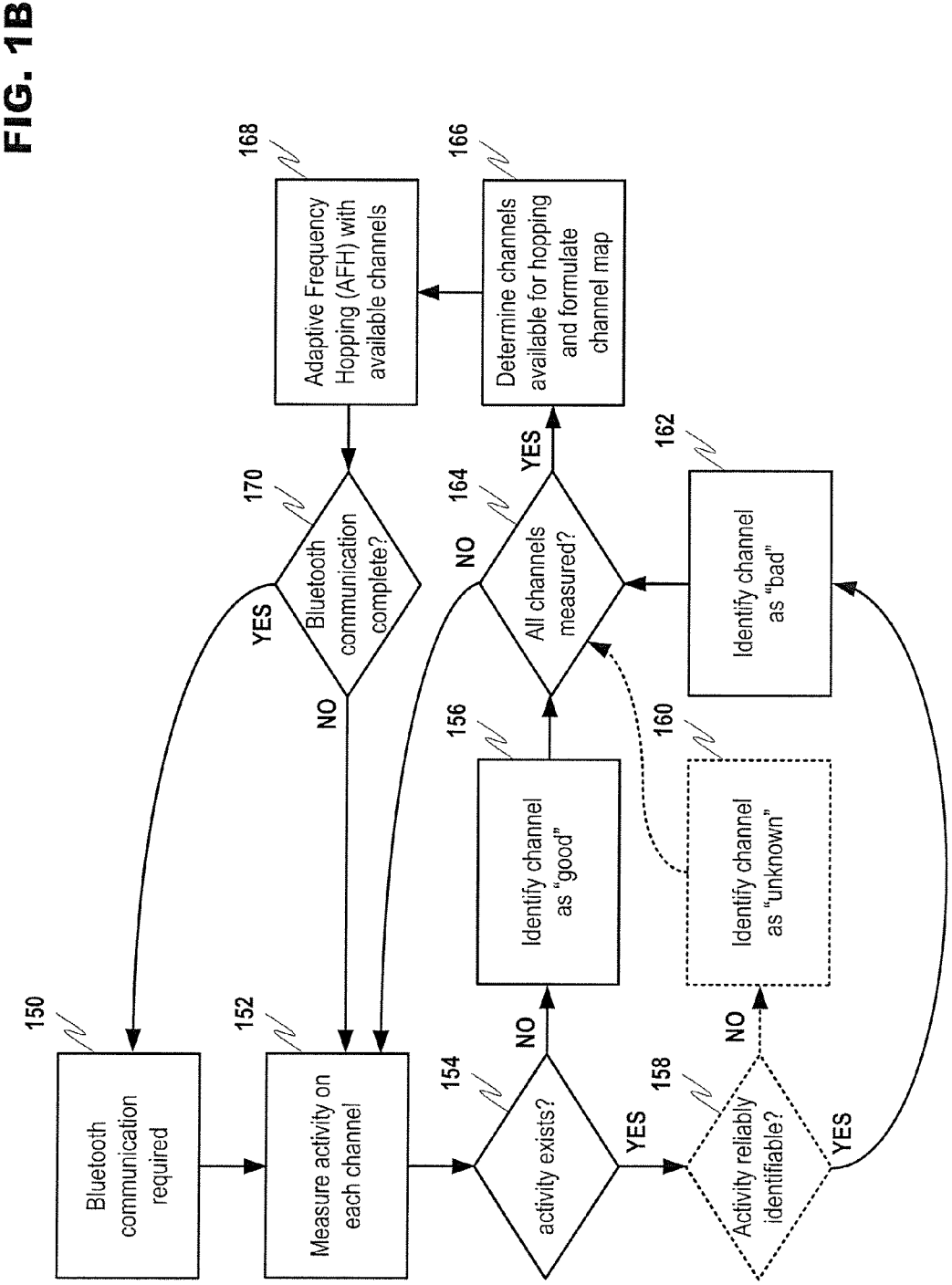
FIG. 1B discloses an exemplary flowchart for a channel classification process in accordance with an embodiment of the present invention.

While the present invention has been described in a variety of exemplary embodiments, various changes can be made therein without departing from the spirit and scope of the invention, as described in the appended claims.

I. Operational Environment for a Basic Wireless Network

FIG. 1A depicts a short-range communication operating environment. A Bluetooth™ network is disclosed for the sake of example; however, the present invention is not specifically limited to the particular wireless communication medium as shown, and may be applied to any wireless network implemented in a similar manner or usable for a similar application. For example, FIG. 1A discloses WCD 100 communicating via Bluetooth™ with a slave device 102. A slave device may include, but is not limited to, an input device (e.g., a headset, keyboard, etc.), an output device (e.g., a printer), a data storage device, etc.

The full Bluetooth™ communication bandwidth is divided into 79 channels displaced by 1 MHz starting at 2.402 MHz and ending at 2.480 MHz. Bluetooth™ uses spread spectrum frequency hopping, wherein a piconet selects a new channel after every 625 μs timeslot. Exemplary communication channels shown in FIG. 1A may include either an indicia "G" denoting that a particular communication channel has been deemed to be "good" (e.g., suitable for use by a particular wireless communication medium), "B" indicating that a particular communication channel was classified as "bad" due to another communication signal being identified as utilizing a channel, or "UN" denoting "unknown" for measured channels where the operational status may be uncertain or indeterminable (e.g., where a signal is not identifiable or may only sporadically occupy the channel). At the moment in time depicted by FIG. 1A, headset slave device 102 and a master communication module in WCD 100 may communicate on any of channels 0, 1, 3-4, 6-7, etc. starting with channel 0. At a configured time slot (625 μs) the devices may jump to the next channel (e.g., channel 1).

Since the band assigned to Bluetooth™ is in public spectrum, the electronic emissions of various other devices may cause interference within a piconet. In this example, WLAN device 120 is operating on the 23 MHz-wide public bandwidth also available for use by the piconet. Any Bluetooth™ transmissions on channels currently in use by WLAN may be lost due to interference caused by WLAN device 120. As a result, the master/slave would be forced to retransmit information, causing both the possibility of lost information and a slowdown of overall system performance. This may also be the case for interference caused by non-communication related emissions, for example, such as by microwave 130 or any other device 140 that may emit radio waves in the bandwidth utilized by Bluetooth™. However, the loss of one or more communication channels may not be overly problematic for the network, since in at least the case of Bluetooth™, only a minimum of 20 available channels out of the total of 79 available channels are required to be used in a piconet.

In the case of Bluetooth™, any device has the potential to be a master or a slave. A piconet is formed when one device connects to another device and they "hop" together through a pseudo-random channel pattern dictated by the master. The connection is established when one device transmits an "Inquire" message to determine other compatible devices in transmission range, or a "Page" message requesting to form a piconet with another device. In response to the Inquire message, the master receives a global identification from all the Bluetooth™ radio equipped devices within transmission distance. A master may then transmit a frequency hop synchronization (FHS) packet to a desired device using its global identification number. Included in the FHS packet is information (hop pattern, clock offset, etc.) allowing the slaves and master to concurrently hop from one frequency to another, ensuring that information will always be transmitted from one member of the piconet and received by another member of the piconet on the same frequency. The slave device will also receive an active member address (AMA), allowing other devices on the piconet to address it. Radios residing in the piconet but not currently active will receive a parked member address (PMA), or may be addressed via their Bluetooth™ Device Address (BD_ADDR).

Ideally, a Bluetooth™ piconet operates in the entire 79 channel spectrum. However, as discussed above, environmental noise may cause interference on some of these channels. Bluetooth™ specification 1.2 introduced the idea of adaptive frequency hopping (AFH) in order to avoid interference and improve overall system performance. In AFH, the master and/or slave senses interference on various channels, and the results are compiled by the master to create a channel map. The channel map allows the master to exclude channels experiencing interference from the channel hop sequence, thereby greatly reducing the chance that transmissions will be lost due to environmental noise.

FIG. 1B discloses a flowchart of an exemplary channel evaluation process usable with at least one embodiment of the present invention. In step 150 the need for a Bluetooth™ wireless connection may be recognized. This need may be created, for example, by an application running on WCD 100, a manual configuration in WCD 100 set by a user activating Bluetooth™, etc. A communication channel may then be measured in step 152 to determine if any interference is present. Interference on a communication channel may be determined in a variety of ways. For example, Received Signal Strength Indication (RSSI) and error-based methods, or hybrids thereof, may be used to classify the channels. In an exemplary RSSI-based methodology, a channel may be measured when the device neither transmits nor receives data. This method may further be used in channels that have already been classified as "good" in the current AFH_Channel_Map to verify that the channel is still clear. If the background RSSI is deemed high, there may be interference on the channel and the channel may be assessed as "bad." In error-based methods, received message packets may be examined to determine their condition. Methods for error-based classification may include, for example, packet error rate, bit error rate, errors in access code, header or payload. Errors in different parts of the packet may be weighted differently. In at least one system embodying the present invention, an error in a packet header may be deemed worse than error in a payload, which does not have forward error correction. An example of a hybrid method, in accordance with at least one embodiment of the present invention, may utilize packet error-based methods on a channel currently in use by the wireless communication medium, and RSSI-based methods on the unused channels where no packets are being received.

Regardless of the particular type of signal sensing methodology being employed, in step 154 a determination may be made as to whether any activity exists on the measured channel. If no activity is detected, then the channel may be classified as "good" in step 156. Alternatively, some signal activity may be detected on a channel. In situations where signal activity may be detected on a channel, WCD 100 may further include the ability to identify a type or source of the signal as disclosed in optional process steps 158-160 (e.g., steps shown with a dotted outline). This identification may be able to classify the type of signal as being related to a particular wireless communication medium (e.g., a WLAN signal) and/or possibly the severity of sensed signal activity for such instances where, for example, the signal does not appear to be a communication signal, such as electronic emissions from a microwave, power cables, etc. WCD 100 may further be enabled to identify a source for the sensed signal activity. This classification information may then be used in steps 160 and 162 to either classify the measured signal activity as "unknown" in step 160 if the signal cannot be reliably identified (e.g., where the measured signal activity is not identifiable or may only sporadically occupy the channel), or as "bad" in step 162 if the signal may be classified as, for example, a communication signal from another wireless communication medium, interference, a desired wireless communication signal having inadequate strength, a wireless communication medium already operating at the maximum allowed utilization, etc.

The previously discussed evaluation may continue for each available channel in the allowed operational spectrum until it has been determined that all channels have been measured in step 164. Then the process may utilize the results of the communication channel evaluation to formulate a channel map in step 166. The channel map may consist of some or all of the channels previously classified as good, and may be utilized by the particular wireless communication medium, in this example it is Bluetooth™, in order to engage in communication in step 168. As is the case with Bluetooth™ operation, WCD 100 may communicate using AFH utilizing the channel map so that the master and any wirelessly-coupled client devices may hop from one communication channel to another in a pattern known to all of the networked devices. The channel measurement process may continue in step 170 until, for example, the original communication requirement is complete. Upon completion, the process may return to step 150 to await another communication requirement.

II. Wireless Communication Device

The present invention may be implemented using a variety of wireless communication equipment. Therefore, it is important to understand the communication tools available to a user before exploring the present invention. For example, in the case of a cellular telephone or other handheld wireless devices, the integrated data handling capabilities of the device play an important role in facilitating transactions between the transmitting and receiving devices.

Figure 2:
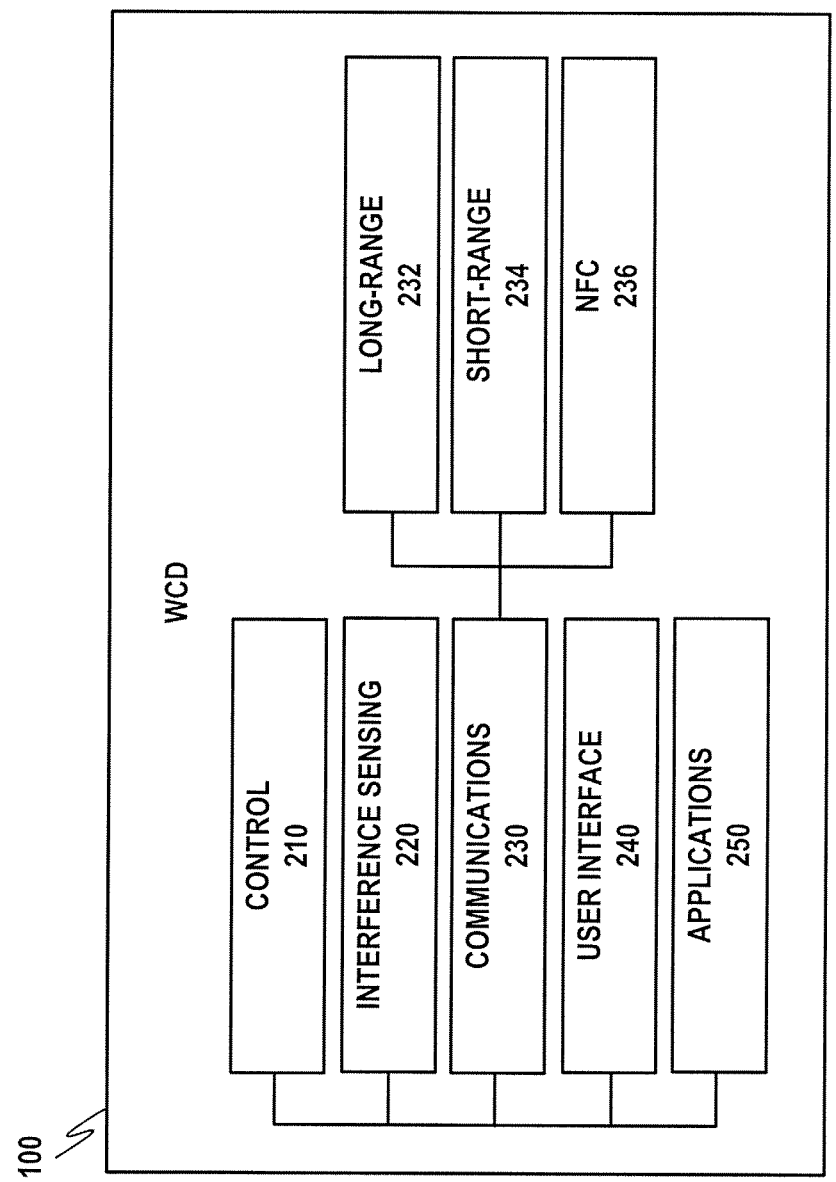
FIG. 2 discloses an exemplary modular representation of a wireless communication device in accordance with an embodiment of the present invention.

FIG. 2 discloses an exemplary modular layout for a wireless communication device usable with the present invention. WCD 100 is broken down into modules representing the functional aspects of the device. These functions may be performed by the various combinations of software and/or hardware components discussed below.

Control module 210 regulates the operation of the device. Inputs may be received from various other modules included within WCD 100. For example, interference sensing module 220 may use various techniques known in the art to sense sources of environmental interference within the effective transmission range of the wireless communication device. Control module 210 interprets these data inputs, and in response, may issue control commands to the other modules in WCD 100.

Communications module 230 incorporates all of the communication aspects of WCD 100. As shown in FIG. 2, communications module 230 may include, for example, long-range communications module 232, short-range communications module 234 and near field communication (NFC) module 236. Communications module 230 may utilize one or more of these sub-modules to receive a multitude of different types of communication from both local and long distance sources, and to transmit data to recipient devices within the transmission range of WCD 100. Communications module 230 may be triggered by control module 210, or by control resources local to the module responding to sensed messages, environmental influences and/or other devices in proximity to WCD 100.

User interface module 240 includes visual, audible and tactile elements which may allow users to receive data from, and enter data into, the device. The data entered by the user may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 incorporates all other hardware and/or software applications on WCD 100. These applications may include sensors, interfaces, utilities, interpreters, data applications, etc., and may be invoked by control module 210 to read information provided by the various modules and in turn supply information to requesting modules in WCD 100.

FIG. 3 discloses an exemplary structural layout of WCD 100 according to an embodiment of the present invention that may be used to implement the functionality of the modular system previously described in FIG. 2. Processor 300 controls overall device operation. As shown in FIG. 3, processor 300 is coupled to one or more communications sections 310, 320 and 340. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the operation of communication sections 310, 320 and 340. Memory 330 may also store software components including a firewall, a service guide manager, a bookmark database, user interface manager, and any communication utilities modules required to support WCD 100.

Long-range communications 310 performs functions related to the exchange of information over large geographic areas (such as cellular networks) via an antenna. These communication methods include technologies from the previously described 1G to 3G. In addition to basic voice communication (e.g., via GSM), long-range communications 310 may operate to establish data communication sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages.

As a subset of long-range communications 310, or alternatively operating as an independent module separately connected to processor 300, transmission receiver 312 allows WCD 100 to receive transmission messages via mediums such as Digital Video Broadcast for Handheld Devices (DVB-H). These transmissions may be encoded so that only certain designated receiving devices may access the transmission content, and may contain text, audio or video information. In at least one example, WCD 100 may receive these transmissions and use information contained within the transmission signal to determine if the device is permitted to view the received content.

Short-range communications 320 is responsible for functions involving the exchange of information across short-range wireless networks. As described above and depicted in FIG. 3, examples of such short-range communications 320 are not limited to Bluetooth™, WLAN, UWB and Wireless USB connections. Accordingly, short-range communications 320 performs functions related to the establishment of short-range connections, as well as processing related to the transmission and reception of information via such connections.

Near field communication (NFC) 340, also depicted in FIG. 3, may provide functionality related to the short-range scanning of machine-readable data. For example, processor 300 may control components in NFC 340 to generate RF signals for activating an RFID transponder, and may in turn control the reception of signals from an RFID transponder. Other short-range scanning methods for reading machine-readable data that may be supported by the NFC 340 include, but are not limited to, IR communication, linear and 2-D (e.g., QR) bar code readers (including processes related to interpreting UPC labels), and optical character recognition devices for reading magnetic, UV, conductive or other types of coded data that may be provided in a tag using suitable ink. In order for the NFC 340 to scan the aforementioned types of machine-readable data, the input device may include optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This is essentially a passive device that may be programmed by processor 300 with information to be delivered in response to a scan from an outside source. For example, an RFID scanner mounted in an entryway may continuously emit radio frequency waves. When a person with a device containing transponder 380 walks through the door, the transponder is energized and may respond with information identifying the device, the person, etc. In addition, a scanner may be mounted (e.g., as previously discussed above with regard to examples of NFC 340) in WCD 100 so that it can read information from other transponders in the vicinity.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communication components stored in memory 330.

The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, NFC 340, user interface 350, transponder 380, etc. through one or more bus interfaces (which may be wired or wireless bus interfaces). Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communication utilities software component, also contained in memory 330, which provides for the establishment of service sessions using long-range communications 310 and/or short-range communications 320. The communication utilities component may include various routines that allow the reception of services from remote devices according to mediums such as the Wireless Application Medium (WAP), Hypertext Markup Language (HTML) variants like Compact HTML (CHTML), etc.

III. Exemplary Operation of a Wireless Communication Device Including Potential Interference Problems Encountered FIG. 4 discloses a stack approach to understanding the operation of a WCD in accordance with at least one embodiment of the present invention. At the top level 400, users may interact with WCD 100. This interaction may involve a user entering information via user input 360 and receiving information from user output 370 in order to activate functionality in application level 410. In the application level, programs related to specific functionality within the device interact with both the user and the system level. These programs include applications for visual information (e.g., web browser, DVB-H receiver, etc.), audio information (e.g., cellular telephone, voice mail, conferencing software, DAB or analog radio receiver, etc.), recording information (e.g., digital photography software, word processing, scheduling, etc.) or other information processing. Actions initiated at application level 410 may require information to be sent from or received into WCD 100. In the example of FIG. 4, data is requested to be sent to a recipient device via Bluetooth™ communication. As a result, application level 410 may then call resources in the system level to initiate the required processing and routing of data.

System level 420 processes data requests and routes the data for transmission. Processing may include, for example, calculation, translation, conversion and/or packetizing the data. The information may then be routed to an appropriate communication resource in the service level. If the desired communication resource is active and available in the service level 430, the packets may be routed to a radio modem for delivery via wireless transmission. There may be a plurality of modems operating using different wireless mediums. For example, in FIG. 4, modem 4 is activated and able to send packets using Bluetooth™ communication. However, a radio modem (as a hardware resource) need not be dedicated only to a specific wireless medium, and may be used for different types of communication depending on the requirements of the wireless medium and the hardware characteristics of the radio modem.

FIG. 5 discloses a situation wherein the above described exemplary operational process may cause more than one radio modem to become active. In this case, WCD 100 is both transmitting and receiving information via wireless communication over a multitude of mediums. WCD 100 may be interacting with various secondary devices such as those grouped at 500. For example, these devices may include cellular handsets communicating via long-range wireless communication like GSM, wireless headsets communicating via Bluetooth™, Internet access points communicating via WLAN, etc.

Problems may occur when some or all of these communications are carried on simultaneously. As further shown in FIG. 5, multiple modems operating simultaneously may cause interference for each other. Such a situation may be encountered when WCD 100 is communicating with more than one external device (as previously described). In an exemplary extreme case, devices with modems simultaneously communicating via Bluetooth™, WLAN and wireless USB would encounter substantial overlap since all of these wireless mediums operate in the 2.4 GHz band. The interference, shown as an overlapping portion of the fields depicted in FIG. 5, would cause packets to be lost and the need for retransmission of these lost packets. Retransmission requires that future time slots be used to retransmit lost information, and therefore, overall communication performance will at least be reduced, if the signal is not lost completely. The present invention, in accordance with at least one embodiment, seeks to optimize communication in one or more wireless mediums by prioritizing the order of communication channels to be scanned, or even narrowing the number of communication channels to be scanned, and possibly adjusting a scan rate for these channels, to improve locating a desired signal faster while also avoiding simultaneous signal activities with interfering signal sources. As a result, the desired wireless connection may be established faster, and time allocated for other systems using the same media in the same multiradio terminal may be maximized. (e.g., because the scan time needed to find an appropriate communication channel may be decreased, more time is left for other systems that, for example, use the same antenna and cannot operate exactly simultaneously, etc.).

IV. A Wireless Communication Device Including a Multiradio Controller.

In an attempt to better manage communication in WCD 100, an additional controller dedicated to managing wireless communication may be introduced. WCD 100, as pictured in FIG. 6A, includes a multiradio controller (MRC) 600 in accordance with at least one embodiment of the present invention. MRC 600 is coupled to the master control system of WCD 100. This coupling enables MRC 600 to communicate with radio modems or other similar devices in communications modules 310 312, 320 and 340 via the master operating system of WCD 100.

Figure 6A:
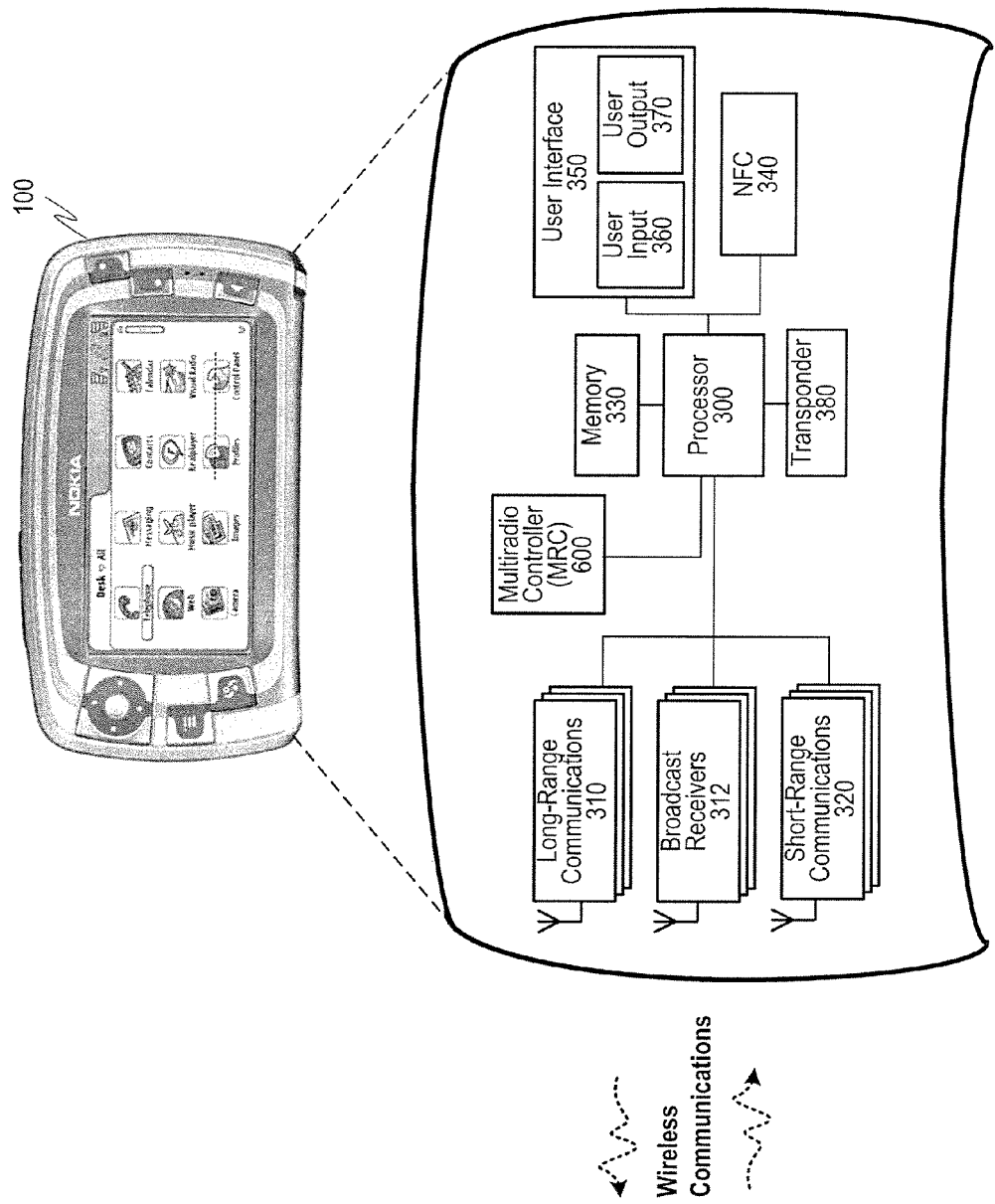
FIG. 6A discloses an exemplary structural description of a wireless communication device including a multiradio controller in accordance with at least one embodiment of the present invention.

FIG. 6B discloses in detail at least one embodiment of WCD 100, which may include multiradio controller (MRC) 600 introduced in FIG. 6A in accordance with at least one embodiment of the present invention. MRC 600 includes common interface 620 by which information may be sent or received through master control system 640. Radio modems 610 and other devices 630 may also be referred to as "modules" in this disclosure as they may contain supporting hardware and/or software resources in addition to the modem itself. These resources may include control, interface and/or processing resources. For example, each radio modem 610 or similar communication device 630 (e.g., an RFID scanner for scanning machine-readable information) may also include some sort of common interface 620 for communicating with master control system 640. As a result, all information, commands, etc. occurring between radio modems 610, similar devices 630 and MRC 600 are conveyed by the communication resources of master control system 640. The possible effect of sharing communication resources with all the other functional modules within WCD 100 will be discussed with respect to FIG. 6C.

FIG. 6C discloses an operational diagram similar to FIG. 4 including the effect of MRC 600 in accordance with at least one embodiment of the present invention. In this system MRC 600 may receive operational data from the master operating system of WCD 100, concerning for example applications running in application level 410, and status data from the various radio communication devices in service level 430. MRC 600 may use this information to issue scheduling commands to the communication devices in service level 430 in an attempt to avoid communication problems.

V. Sharing Information Between Wireless Communication Mediums

The present invention, in at least one embodiment, may optimize the operation of a wireless communication medium that may not inherently include the ability to optimize operation. This optimization may be perpetuated by the sharing the information between the resources that support the wireless communication in WCD 100. Since various information sharing mechanisms may exist, the present invention is not limited to any one specific hardware and/or software configuration needed for implementation. For example, one mechanism for managing the interoperation of various radio modems 610 or other communication devices 630 is MRC 600. However, the present invention may also be implemented via firmware embedded in the radio modems themselves. In such an exemplary configuration, one radio module may serve as an information provider to another radio module, which uses the information to optimize operation. In addition, other operational architectures also exist, for example, as software modules running on WCD 100, etc.

Figure 7A:
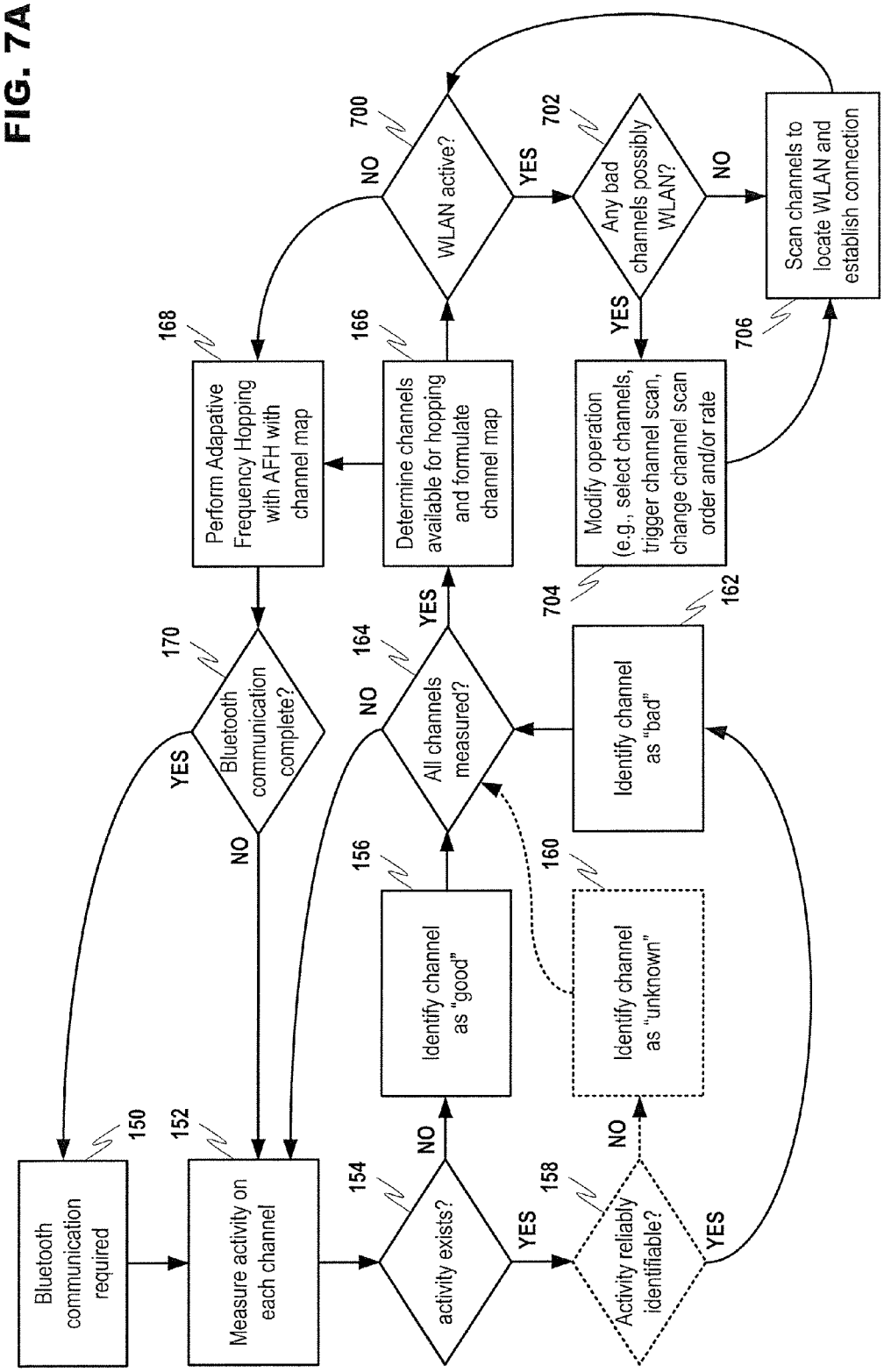
FIG. 7A discloses a flowchart of a communication channel condition information sharing process in accordance with an embodiment of the present invention.

FIG. 7A shows an exemplary process for utilizing information gather by one wireless communication medium in order to optimize the operation of another wireless communication medium in accordance with at least one embodiment of the present invention. Steps 150 to 166 are identical to the steps previous discussed with respect to FIG. 1B. This is because the operation of wireless communication medium providing information to another wireless communication medium may not be affected except for the provision of communication channel condition information to the other wireless communication medium in step 164. With respect to the disclosed example, Bluetooth™ can already classify the channels using the measurement information. Although for Bluetooth™ purposes, it is basically enough to know, which channels must be avoided, the AFH algorithms may analyze the type of the interferer (e.g. WLAN or microwave oven). Also the information about the interference RSSI may be available. Thus, when measurements have been performed and analyzed, Bluetooth™ knows on which channel there exist interferers and possibly the type of the interferer (e.g., on which channel there may be interfering WLAN traffic).

The previously discussed information pertaining to communication channel condition may be received by a secondary wireless communication medium, WLAN in this particular example, in step 700. If WLAN is not currently active (e.g., no requirement exists for WLAN communication), then in step 700 the process flow may return to the Bluetooth™ process flow in step 168. However, if WLAN is active, the information received from the primary wireless communication medium (e.g., Bluetooth™) may be utilized in step 702. In this step, if communication channels indicated as bad by the primary wireless communication medium were further identified as possibly containing signal activity related to the secondary wireless communication medium, then this channel information may be utilized in step 704.

In steps 704 and 706, the channel condition information received from the primary wireless communication medium may be utilized to optimize the operation of the secondary wireless communication medium. This optimization may be implemented to alter behavioral attributes of WCD 100 with respect to the secondary wireless communication medium. For example, when the results of a Bluetooth™ channel measurement have been transferred from resources in WCD 100 supporting Bluetooth™ to WLAN in some form, the WLAN support resources in WCD 100 may analyze the data and define the scan parameters according to the results. In instances where the interference type has been identified, WLAN may create a scan list of channels to be scanned by WLAN modem 610 when scanning is required. This scan list may, for example, contain a subset of all available communication channels that have been determined to possibly to contain a WLAN communication signal.

Moreover, various embodiments of the present invention may also modify the operation of WLAN scanning in terms of channel scan triggering, order and/or frequency, implemented alone or in conjunction with the above exemplary scan list creation. For example, channels that are more likely to have WLAN traffic (e.g., channels having possible WLAN signal activity) may be given priority (e.g., scanned first or earlier), as determined in step 704, and channels that appear to be empty may be scanned afterwards, or may even be omitted. Further, scanning may be triggered (e.g., activated or deactivated) for a particular channel based on a determination of signal activity on the channel. This determination may also be utilized in order to control the frequency (e.g., scan rate) for different channels. For example, a channel scan rate may be increased for channels that contain signal activity in order to expedite connection, and may be decreased in situations where no signal activity exists to conserve resources in WCD 100. In step 706, WLAN channel scanning may begin either in standard form (from step 702) or in a modified form (from step 704). When during the scanning process an appropriate AP is found, the scanning may be stopped and WLAN communication may proceed. After completion, the process may then restart in step 700.

In further examples of the present invention, if interference RSSI information is available from interfered-with channels, it may be used to set the order of the first scanned channels, i.e. the channel with highest RSSI is scanned first. This may be the case when Bluetooth™ has detected multiple interferers which may be WLAN. If the interference RSSI on a reported channel is below a threshold (e.g., the source of the WLAN signal may be too distant), WLAN support in WCD 100 may decide not to include this channel amongst the channels to be scanned first. In addition, the RSSI value may be used to set the transmission power of the probe request. If the reported interference RSSI is high WLAN may be near and the probe request may be transmitted with lower power, which optimizes power consumption.

When WLAN modem 610 is not coupled to another device, it may perform periodic searching (e.g. every five minutes). However, if WLAN support resources in WCD 100 are aware that Bluetooth™ is active, and that Bluetooth™ has performed reliable channel classification that has not detected interference that may be classified as being related to WLAN, WCD 100 may adjust the WLAN scan rate. For instance, WCD 100 may perform the WLAN search less frequently (e.g., the host initiates the scan every ten minutes instead of every five minutes) in response to Bluetooth™ not detecting activity in the scanned channels. Also if the WLAN support resources in WCD 100 get fresh Bluetooth™ interference information that clearly indicates possible WLAN signal activity on at least one communication channel, WCD 100 may alter the WLAN scan to increase the scan rate.

In a particular optimization example incorporating scan rate adjustment, consider a scenario where periodic WLAN scanning indicates no results (e.g., utilizing approximately a 5-minute scan frequency) followed almost immediately by a Bluetooth™ AFH scan (e.g. 30 seconds later). In this case, it is not very probable that signal activity identified by the Bluetooth™ AFH is really being caused by nearby WLAN device, so there's no need to alter the WLAN frequency scan. In addition, Bluetooth™ AFH scans typically occur more frequently than WLAN, so significant operational activities may be based on the detection of a change in activity of channels scanned during Bluetooth™ AFH operation. In other words, if no networks are discovered during WLAN scanning, and Bluetooth™ AFH scanning indicates the same, then the WLAN scanning rate may be reduced (e.g., once every 10 minutes) in order to conserve power and/or processing resources. Later, if Bluetooth AFH measures signal activity indicating a potential WLAN network, this information may be used to trigger an immediate WLAN scan and/or to increase the WLAN scan frequency (e.g., once in every 5 minutes starting from the new scanning reference point). If RSSI signal measurement is available, certain triggers for WLAN scan rate adjustment may be disregarded in situations where, for example, a RSSI value for the detected signal is determined to be so small that the potential WLAN source may be considered outside of reliable WLAN communication range.

Figure 7B:
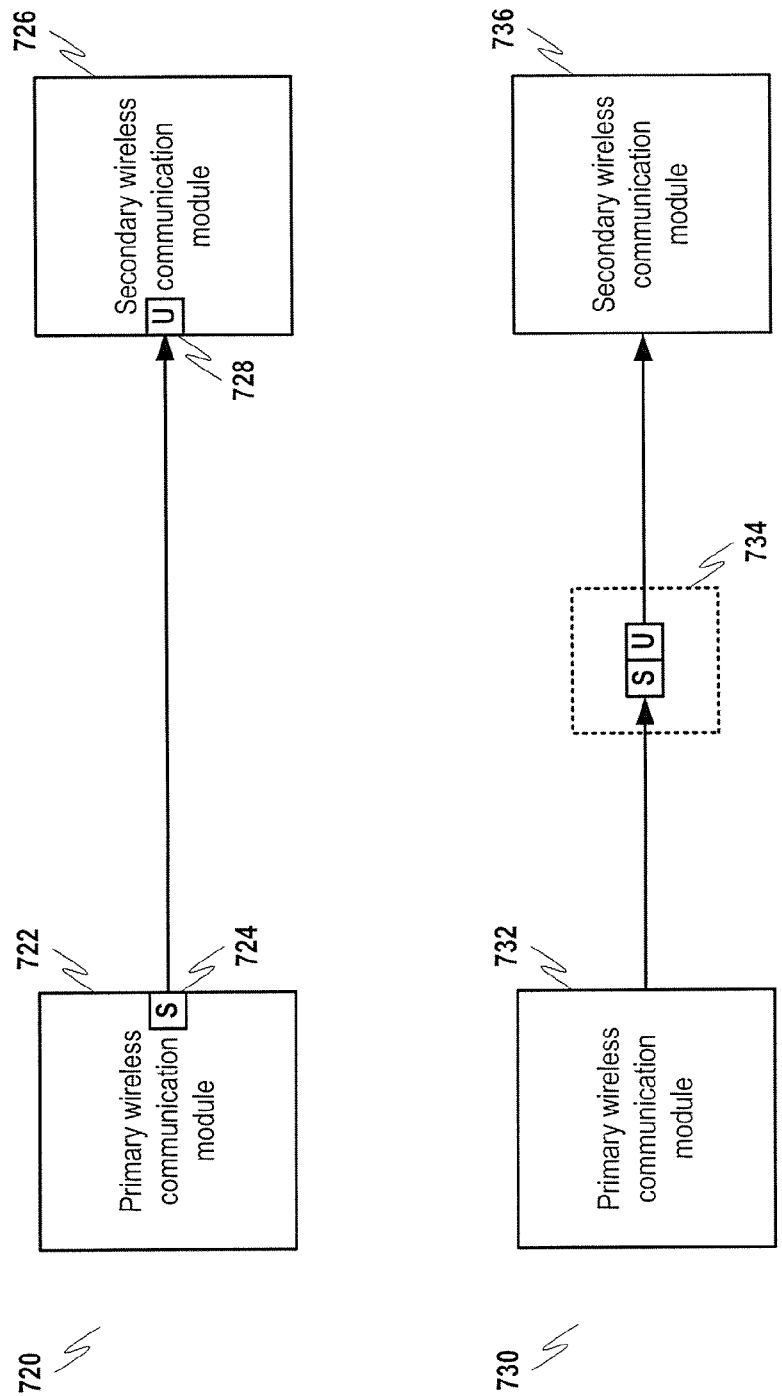
FIG. 7B discloses exemplary diagrams of radio module communication structure in accordance with at least one embodiment of the present invention.

FIG. 7B describes exemplary architectures usable in accordance with various embodiments of the present invention. Architecture 720 discloses a primary wireless communication module 722 including scanning resources "S" 724 coupled to secondary wireless communication module 726 having channel activity information utilization module "U" 728. While only a secondary wireless communication module 726 is shown, the present invention is not limited as such as information provided by primary wireless communication module 722 may be utilized by one or more consuming wireless communication modules. In this exemplary configuration, each radio module may include hardware and/or or software integrated within each module supporting "S" resources 724 and "U" resources 728.

The exemplary implementation shown at 730 in FIG. 7B may be utilized in lieu of, or in combination with, architecture 720. Architecture 730 moves "S" resources 724 and "U" resources 728 into module 734. Module 734 may be implemented as a separate control component that may receive communication channel activity information from primary wireless communication module 732, which may be processed in order to determine a reduced channel scan list for secondary wireless communication module 736. For example, module 734 may receive indication information from various resources supporting a first wireless communication medium (e.g., channel measurement and/or identification resources supporting Bluetooth™ in WCD 100 and/or other wirelessly linked devices) regarding whether one or more communication channels are usable by the first wireless communication medium. Module 734 may then in turn utilize the indication information to determine an operational mode for at least one other wireless communication medium, and then pass instructions corresponding to this operational mode to control the operation of the at least one other wireless communication medium (e.g., WLAN). These instructions may modify the operation of the at least one other wireless communication medium, such as prioritizing the scan order of communication channels, triggering channel scanning in the second wireless communication medium, changing a scan rate for one or more communication channels, etc.

Architecture 730 may be more appropriate for use in particular device configurations, such as in the case where the implementation of at least one embodiment of the present invention is desired in a device that utilizes standard or "off-the-shelf" radio modules for primary wireless communication module 732 and secondary wireless communication module 736. In other words, costs and/or burdens involved in substantial component and/or device redesign may be avoided by using separate control module 734.

FIG. 7C discloses an example of operational information that may be provided by Bluetooth™ modem 750 to WLAN Host 756 via Bluetooth host 754, which may also receive channel activity information from separate interference information collector entity 752. The AFH_channel_map alone may not be a reliable source for determining WLAN channel information. The master may have formed the AFH_channel_map based on both the local channel classification and any channel classifications supplied by slave devices coupled to WCD 100, some of the channels being set as good based on the slave classification. This may be because otherwise there would be too few channels in the map (e.g., less than 20, as required), or because only one slave has classified a channel as bad while the other slaves have classified the same channel as good. Therefore, local channel classification information and also preferably the channel classifications supplied from slave devices may be used.

When the channel classification and AFH_channel_map information is evaluated in WLAN host 756, WLAN host 756 may also take into account that local Bluetooth channel classification may be based, in part, on collaborative information from within WCD 100 (e.g., information which Bluetooth™ Host 754 received from WLAN host 756. However, this information would not be available to Bluetooth™ Host 754 if WLAN host 756 is not associated to any AP (e.g., WLAN is not currently active in WCD 100).

In addition to channel classification, probable signal activity type and channel map information, Bluetooth™ Host 754 may also receive other useful information from the communication channels during the measurements. It could be useful, for example, to measure the signal strength (RSSI) of the interferer and not just mark the channel as bad. The signal strength may be interpreted as an estimate of the distance from the interferer. WCD 100 may then first scan the WLAN channels on which the AP seems to be closest (e.g., with highest signal strength). Bluetooth™ Host 754 may access the new interference indications, as shown by the examples of FIG. 7C, from the Bluetooth™ modem 750 for example with new (non-standard) HCI commands. Bluetooth™ Host 754 or some other entity may then evaluate the reported information to determine the type of the interferer. In some cases the estimate of the type of the interferer may also be available from Bluetooth™ modem 750.

FIG. 8 discloses an exemplary effect of a process in accordance with at least one embodiment of the present invention on a secondary wireless communication medium (e.g., a wireless communication medium that includes no inherent optimization ability). Host 800 and modem 802 show a typical interaction between entities before the application of an embodiment of the present invention. In this example, a periodic search is conducted of all channels within the designated bandwidth until an appropriate response is received, for example, from a WLAN AP. This search would necessitate the wasted expenditure of both time and power resources in a non-optimized or "brute force" connection methodology. However, in the subsequent example including host 810 and modem 812, the number of potential WLAN communication channels to search have been greatly reduced based, for example, on information provided by the resources supporting the primary wireless communication medium, for example Bluetooth™. In addition, the channel scan list of potential WLAN communication channels may be ordered, such as shown in FIG. 8, so as to place the channels that more probably represent WLAN communication nearer to the top of the scan list. As a result of this process, there may be fewer communication channels to scan and the channels being scanned earlier represent the best candidates for WLAN communication, which may result in a connection to a viable communication signal after scanning only one communication channel, as opposed to the many channels that had to be scanned before the improvements realized by various embodiments of the present invention. As a result, the operation of a secondary wireless communication medium may be optimized, and the amount of time and energy expended to establish a connection may be minimized and/or conserved.

Accordingly, it will be apparent to persons skilled in the relevant art that various changes in form a and detail can be made therein without departing from the spirit and scope of the invention. The breadth and scope of the present invention should not be limited by any of the above-described exemplary embodiments, but should be defined only in accordance with the following claims and their equivalents.

What is claimed is:

1. A method, comprising:
scanning, by a Bluetooth radio module of a wireless communication device, one or more communication channels corresponding to a Bluetooth communication medium on which the Bluetooth radio module operates;
detecting, via said scanning, activity on at least one of the one or more communication channels corresponding to the Bluetooth communication medium;
determining that the detected activity on the at least one of the one or more communication channels is interference to operation of the Bluetooth radio module;
adjusting operation of the Bluetooth radio module to avoid the at least one of the one or more communication channels on which interfering activity has been detected;
determining the detected interfering activity to correspond to one or more networks usable by a wireless local area network (WLAN) radio module of the wireless communication device for operation on a WLAN communication medium;
storing information indicating whether the at least one of the one or more communication channels on which interfering activity has been detected are usable by the WLAN radio module;
passing the indicative information to the WLAN radio module of the wireless communication device; and
modifying, based on the indicative information, operation of the WLAN radio module by increasing a channel scan rate of the WLAN radio module on the WLAN communication medium in response to said determining that the detected interfering activity corresponds to one or more networks usable by the WLAN radio module.

2. A method according to claim 1, wherein one or more communication channels corresponding to the one or more of said networks are included in a set of channels to be scanned by the WLAN radio module on the WLAN communication medium.

3. A method according to claim 1, wherein said modifying operation en of the WLAN communication module includes scanning one or more communication channels corresponding to the one or more of said networks in a priority order based on the indicative information.

4. A method according to claim 1, wherein the channel scan rate of the WLAN communication module is decreased when none of the one or more channels are determined to have activity that corresponds to the WLAN communication medium.

5. A method according to claim 1, wherein said modifying operation of the WLAN communication module includes triggering channel scanning of the WLAN communication module when one or more channels are determined to have activity that corresponds to the WLAN communication medium.

6. A device, comprising:
at least one processor; and
at least one memory including computer program code configured to, with the at least one processor, cause the device to:
scan, by a Bluetooth radio module of the device, one or more communication channels corresponding to a a Bluetooth communication medium on which the Bluetooth radio module operates;
detect, via said scan, activity on at least one of the one or more communication channels corresponding to the Bluetooth communication medium;

determine that the detected activity on the at least one of the one or more communication channels is interference to operation of the Bluetooth radio module;

adjust operation of the Bluetooth radio module to avoid the at least one of the one or more communication channels on which interfering activity has been detected;

determine the detected interfering activity to correspond to one or more networks usable by a wireless local area network (WLAN) radio module of the device for operation on a WLAN communication medium;

store information in the device indicating whether the at least one of the one or more communication channels on which interfering activity has been detected are usable by the WLAN radio module;

pass the indicative information to the WLAN radio module of the wireless communication device; and modify, based on the indicative information, operation of the WLAN radio module by increasing a channel scan rate of the WLAN radio module on the WLAN communication medium in response to said determining that the detected interfering activity corresponds to one or more networks usable by the WLAN radio module.

7. A device according to claim 6, wherein the processor is further configured to instruct including of one or more communication channels corresponding to the one or more of said networks in a set of channels to be scanned by the WLAN radio module on the WLAN communication medium.

8. A device according to claim 6, wherein the processor is further configured to instruct scanning of one or more communication channels corresponding to the one or more of said networks in a priority order based on the indicative information.

9. A device according to claim 6, wherein the processor is further configured to instruct decreasing of the channel scan rate of the WLAN communication module when none of the one or more channels are determined to have activity that corresponds to the WLAN communication medium.

10. A device according to claim 6, wherein the processor is further configured to instruct triggering of channel scanning of the WLAN communication module when one or more channels are determined to have activity that corresponds to the WLAN communication medium.

11. A computer program product comprising a non-transitory computer readable medium having computer readable program code embodied in said medium, comprising:

a computer readable program code configured to cause a first radio module of a wireless communication device to scan one or more communication channels corresponding to a Bluetooth communication medium on which the Bluetooth radio module operates;

a computer readable program code configured to detect, from said scan, activity on at least one of the one or more communication channels corresponding to the Bluetooth communication medium;

a computer readable program code configured to determine that the detected activity on the at least one of the one or more communication channels is interference to operation of the Bluetooth radio module;

a computer readable program code configured to adjust operation of the Bluetooth radio module to avoid the at least one of the one or more communication channels on which interfering activity has been detected;

a computer readable program code configured to determine the detected interfering activity to correspond to one or more networks usable by a wireless local area network (WLAN) radio module of the wireless communication device for operation on a WLAN communication medium;

a computer readable program code configured to store information in the device indicating whether the at least one of the one or more communication channels on which interfering activity has been detected are usable by the WLAN radio module;

a computer readable program code configured to pass the indicative information to the WLAN radio module of the wireless communication device; and a computer readable program code configured to modify, based on the indicative information, operation of the WLAN radio module by increasing a channel scan rate of the WLAN radio module on the WLAN communication medium in response to said determining that the detected interfering activity corresponds to one or more networks usable by the WLAN radio module.

12. A computer program product according to claim 11, further comprising a computer readable program code configured to include one or more communication channels corresponding to the one or more of said networks in a set of channels to be scanned by the WLAN radio module on the WLAN communication medium.

13. A computer program product according to claim 11, further comprising a computer readable program code configured to scan one or more communication channels corresponding to the one or more of said networks in a priority order based on the indicative information.

14. A computer program product according to claim 11, further comprising a computer readable program code configured to decrease the channel scan rate of the WLAN communication module when none of the one or more channels are determined to have activity that corresponds to the WLAN communication medium.

15. A computer program product according to claim 11, further comprising a computer readable program code configured to trigger channel scanning of the WLAN communication module when one or more channels are determined to have activity that corresponds to the WLAN communication medium.

16. A controller, comprising:

one or more interfaces; and a processor coupled to the one or more interfaces, the processor being configured to:

receive information from a Bluetooth radio module of a device operating on a Bluetooth communication medium, said information indicating whether one or more communication channels shared with a wireless local area network (WLAN) communication medium are usable by a WLAN radio module of the device, wherein whether the indicative information is received from the Bluetooth radio module is based in part on scanning, by the Bluetooth radio module, of the one or more communication channels and detecting, via said scanning, activity on at least one of the one or more communication channels, wherein the activity is determined to be interference to operation of the Bluetooth radio module, and wherein the detected interfering activity is determined to correspond to one or more networks usable by the WLAN radio module of the device;

adjust operation of the Bluetooth radio module to avoid the at least one of the one or more communication channels on which interfering activity has been detected;

determine, based on the received indicative information, a modified operational mode for the WLAN radio module of the device; and pass instructions corresponding to the determined modified operational mode to control operation of the WLAN radio module operating on the WLAN communication medium, wherein the passed instructions comprise instructions to increase a channel scan rate of the WLAN radio module based on the indicative information in response to said determining that the detected interfering activity corresponds to one or more networks usable by the WLAN radio module.

17. A method, comprising:

receiving information from a Bluetooth radio module of a device operating on a Bluetooth communication medium, said information indicating whether one or more communication channels shared with a wireless local area network (WLAN) communication medium are usable by a WLAN radio module of the device, wherein whether the indicative information is received from the Bluetooth radio module is based in part on scanning, by the Bluetooth radio module, of the one or more communication channels and detecting, via said scanning, activity on at least one of the one or more communication channels, wherein the activity is determined to be interference to operation of the Bluetooth radio module, and wherein the detected interfering activity is determined to correspond to one or more networks usable by the WLAN radio module of the device;

adjusting operation of the Bluetooth radio module to avoid the at least one of the one or more communication channels on which interfering activity has been detected;

determining, based on the received indicative information, a modified operational mode for the WLAN radio module of the device; and passing instructions corresponding to the determined modified operational mode to control operation of the WLAN radio module operating on the WLAN communication medium, wherein the passed instructions comprise instructions to increase a channel scan rate of the WLAN radio module based on the indicative information in response to said determining that the detected interfering activity corresponds to one or more networks usable by the WLAN radio module.

18. A computer program product comprising a non-transitory computer readable medium having computer readable program code embodied in said medium, comprising:

a computer readable program code configured to receive information from a Bluetooth radio module of a device operating on a Bluetooth communication medium, said information indicating whether one or more communication channels shared with a wireless local area network (WLAN) communication medium are usable by a WLAN radio module of the device, wherein whether the indicative information is received from the Bluetooth radio module is based in part on scanning, by the Bluetooth radio module, of the one or more communication channels and detecting, via said scanning, activity on at least one of the one or more communication channels, wherein the activity is determined to be interference to operation of the Bluetooth radio module, and wherein the detected interfering activity is determined to correspond to one or more networks usable by the WLAN radio module of the device;

a computer readable program code configured to determine, based on the received indicative information, a modified operational mode for the WLAN radio module of the device; and a computer readable program code configured to pass instructions corresponding to the determined modified operational mode to control operation of the WLAN radio module operating on the WLAN communication medium, wherein the passed instructions comprise instructions to increase a channel scan rate of the WLAN radio module based on the indicative information in response to said determining that the detected interfering activity corresponds to one or more networks usable by the WLAN radio module.

* * * * *